United States Patent [19]

Guertin et al.

[11] Patent Number: 4,498,617
[45] Date of Patent: Feb. 12, 1985

[54] METHOD FOR RESHAPING A GAS TURBINE ENGINE COMBUSTOR PART

[75] Inventors: Joseph J. Guertin, Bristol; Earl J. Provencal, Plainville, both of Conn.

[73] Assignee: United Technologies Corporation, Hartford, Conn.

[21] Appl. No.: 480,658

[22] Filed: Mar. 31, 1983

[51] Int. Cl.³ .................. B23K 9/235; B23K 9/225; B23K 37/04
[52] U.S. Cl. .................................. 228/119; 60/740; 72/342; 72/393; 228/173 R; 228/232
[58] Field of Search ............... 228/119, 173 R, 232; 72/342, 393; 219/7.5, 8.5; 29/447; 60/39.32, 740

[56] References Cited

U.S. PATENT DOCUMENTS

| 1,153,480 | 9/1915 | Beugler | 72/393 |
| 1,926,400 | 9/1933 | Palmer | 72/393 |
| 3,832,509 | 8/1974 | Milkhailov et al. | 219/7.5 |
| 4,365,470 | 12/1982 | Matthews | 60/39.32 |
| 4,408,382 | 10/1983 | Campbell | 29/447 |

Primary Examiner—Kenneth J. Ramsey
Attorney, Agent, or Firm—C. G. Nessler

[57] ABSTRACT

A combustor liner for a gas turbine engine, which has become distorted during use or repair, is restored to its original dimensions by selective heating at two circular locations, accompanied by outward radial replacement. An induction coil is used to heat the liner. When the support ring parts are also replaced, the high temperature mechanical reforming procedure is such that the subsequent distortion which accompanies the welding replacement of support rings is compensated for.

6 Claims, 4 Drawing Figures

METHOD FOR RESHAPING A GAS TURBINE ENGINE COMBUSTOR PART

TECHNICAL FIELD

The present invention relates to the hot forming of parts of metal combustors for gas turbine engines, in particular to the correct dimensioning of used and remanufactured parts.

BACKGROUND

Modern gas turbine engines which are used on aircraft are technically very complex machines. The high technology is especially apparent in the portions of the engine which operate at elevated temperature. Not only are such components subjected to degrading temperatures, corrosion, and thermal fatigue, but they must be made as light as possible in design, according to the dictates of their use in aircraft. While most of the components in modern gas turbine engines have long lives, there is inevitably some degradation with prolonged use. Since the components are rather costly because of the high technology them embody, there is a great desire to repair or rework parts to the extent this is possible.

One of the components which falls within the foregoing context is the combustor liner of the engine. The combustor or burner is the portion of the engine where fuel is mixed with compressed air and combustion takes place. The combustor liner, illustrated in the Figures, is an annular structure having an inner and an outer wall; it is closed at one end where there are fuel injection nozzles, and open at the other end where the hot products of combustion are discharged toward the turbine section of the engine. On a large gas turbine engine this liner might have an outside diameter of 39 inches, an inside diameter of about 23 inches and a length of about 17 inches. Typically, it will be made of a wrought nickel superalloy, such as Hastelloy X, having a typical thickness of about 0.045 inches. It will thus be appreciated that the structure is relatively light in construction for its size. During use, thermal fatigue cracks sometimes occur and, more generally, there is warping and distortion of the structure.

However, in repair operations heretofore it has been a problem that the degree of distortion resulting from use or welding was substantial. This has required corrective deformations of portions of the liner by as much as a half inch in space. And, despite fixturing of the portions of the apparatus, it is commonly observed that the combustor liner after welding does not meet the required dimensions, as they were dictated by the fixture. An obvious approach which has been taken has been to attempt to cold form the structure to bring it into compliance with the required dimensions. But, given the complexity of the liner structure, this is not so easily achieved. Either the requisite dimensions cannot be achieved owing to consequential secondary distortion of a remote portion of the structure, or there is cracking of portions of the structure. While Hastelloy X is commonly thought to be a material which can be cold formed, it appears that the complexity of the structure and perhaps changes in the character of the material due to its prolonged use make cracking more likely than would appear apparent at first. This observation might lead one to consider hot working of the structure. But the physical size of the structure and the resultant necessity that the tooling being used in straightening be heat resistant makes it somewhat infeasible.

DISCLOSURE OF THE INVENTION

An object of the invention is to provide means by which annular combustor liners for particular gas turbine engines may be deformed to correct their dimensions. Another object of the invention is to provide a method of repairing combustor liners which involves replacement of fuel support portions by welding, but which results in a structure meeting the dimensional requirements upon completion.

According to the invention a liner for a gas turbine engine which is made of a high temperature alloy such as Hastelloy X is preferentially heated at two circular band regions, and while it is heated it is rapidly deformed to cause the support rings which are an integral part of it to move radially outward. The particular liner configuration to which the invention is pertinent is comprised of a cylindrical wall portion and an attached radially extending flange portion. In the flange portion are mounted a multiplicity of circular support rings. The object of the invention is to move these support rings to the correct position.

In the preferred practice of the invention a band at the region where the circular wall joins the flange and a band on the radial extension of the flange, on the radially opposite side of the circle of support rings, are heated. When only one region is heated, proper results are not obtained, but buckling and cracking is observed. In the preferred practice of the invention with a liner made of Hastelloy X, the band regions are heated to a temperature of about 1800° F. in a relatively short time. This avoids heating the support rings or other regions of the liner to temperatures in excess of 1200° F. It also avoids heating portions of the fixture. Preferably, induction heating is used by means of an induction coil which is comprised of two concentric turns, one mounted adjacent each of the aforementioned bands.

In another embodiment of the invention, where the support rings are replaced by new support rings, we have discovered an improved procedure. Before the old support rings are removed, the aforementioned reforming operation is performed. But, the support rings are moved to a radial position which is beyond that which is desired in the final structure. Then the support rings are removed and new ones are welded in place using conventional fixturing. After the new support rings are installed and the liner is removed from the fixture, it is found that the support ring location has moved back along the path previously traveled by the old rings, to the final location which is desired in the end product.

The invention is advantageous in making possible the salvaging of used components which previously were discarded. This constitutes a significant economic benefit and avoidance of unnecessary waste. When accurate dimensions are achieved in remanufactured combustor liners, the optimum performance of the gas turbine engine is achieved.

The foregoing and other objects, features and advantages of the present invention will become more apparent from the following description of preferred embodiments and accompanying drawings.

BRIEF DESCRIPTION OF THE DRAWINGS

FIG. 4 is a fragmentary view of the apparatus which is largely concealed within the inner diameter of the liner piece shown in FIG. 1, which apparatus is used to move parts of the liner radially outward.

BEST MODE FOR CARRYING OUT THE INVENTION

The invention is described in terms of its application to a combustor liner for a Pratt & Whitney Aircraft JT9D-59/70 or JT9D-59/7Q gas turbine engine. This liner is comprised of two parts and is made of the wrought non-hardenable alloy Hastelloy X (by weight percent 22Cr, 1.5Co, 0.10C, 18.5Fe, 9Mo, 0.6W, balance Ni). This liner is a typical annular liner in that there are a multiplicity of overlapping circular segments joined together, and there are a great number of perforations through these segments to enable cooling air to flow from the exterior bore of the liner into the chamber itself. The invention will be pertinent to combustor liners having similar design features, such as those disclosed in U.S. Pat. Nos. 3,978,662, 4,050,241, 3,995,422, 4,077,205 and patent application Ser. No. 440,675 by Dierberger.

The typical annular liner consists of continuous inner and outer circular walls (also called shrouds) concentrically arranged about a central axis (which axis in use coincides with the axis of the gas turbine engine). The inner and outer walls are joined together at the one end by a portion known as the bulkhead or dome (and referred to generally herein as the flange portion). The bulkhead is typically attached to one wall (the outer) and disconnectably attached to the other (inner) wall. This permits easy manufacture and remanufacture of the combustor. Mounted on the contoured bulkhead are heavier ring shaped sections which receive the fuel nozzles. Usually, the fuel nozzles are adapted to discharge both fuel and a small quantity of swirling air into the combustion chamber which is defined by the inner and outer walls and the bulkhead.

Figure 1:
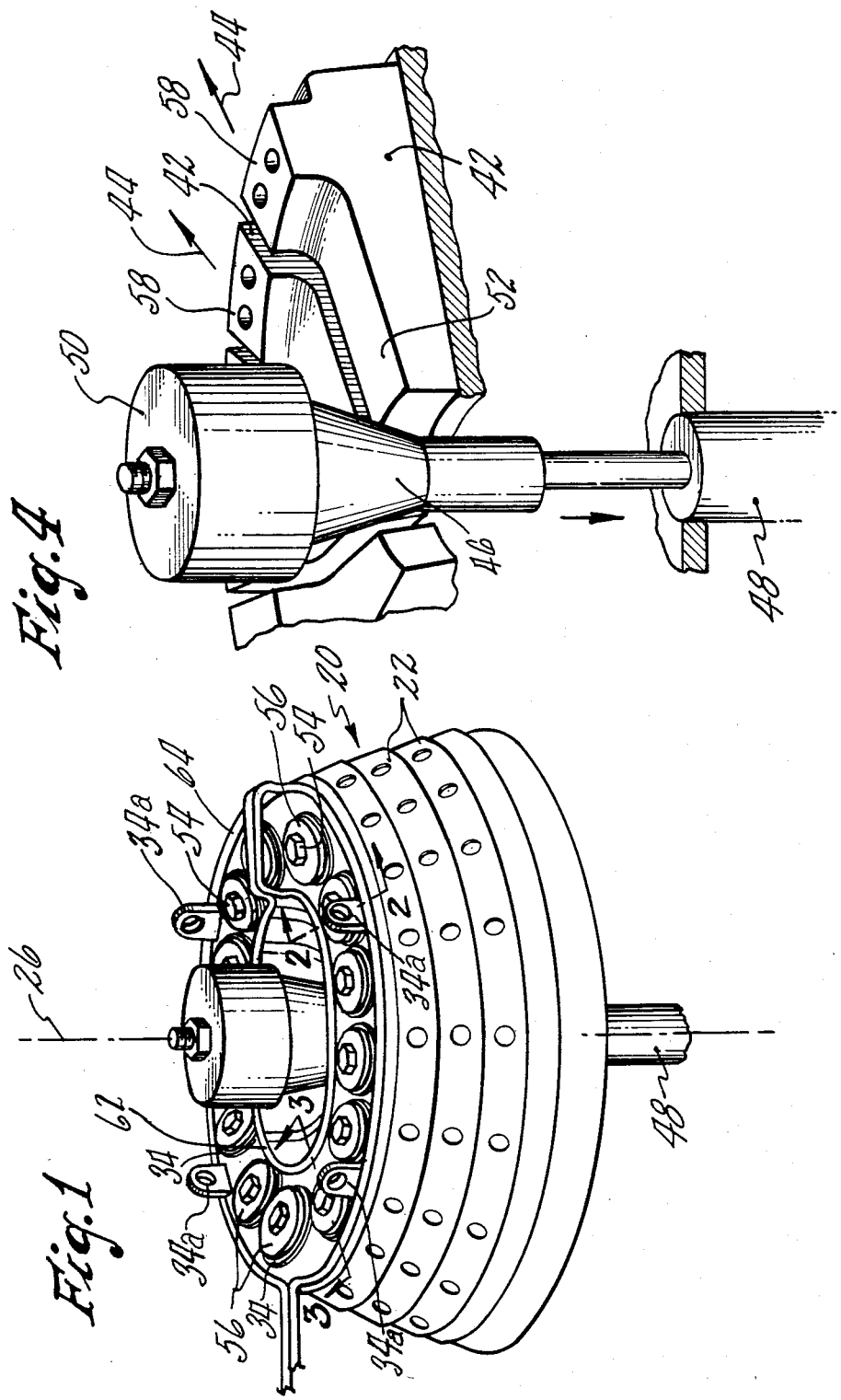
FIG. 1 shows a portion of an annular combustor liner mounted in a fixture with a heating coil in place.
Figure 2:
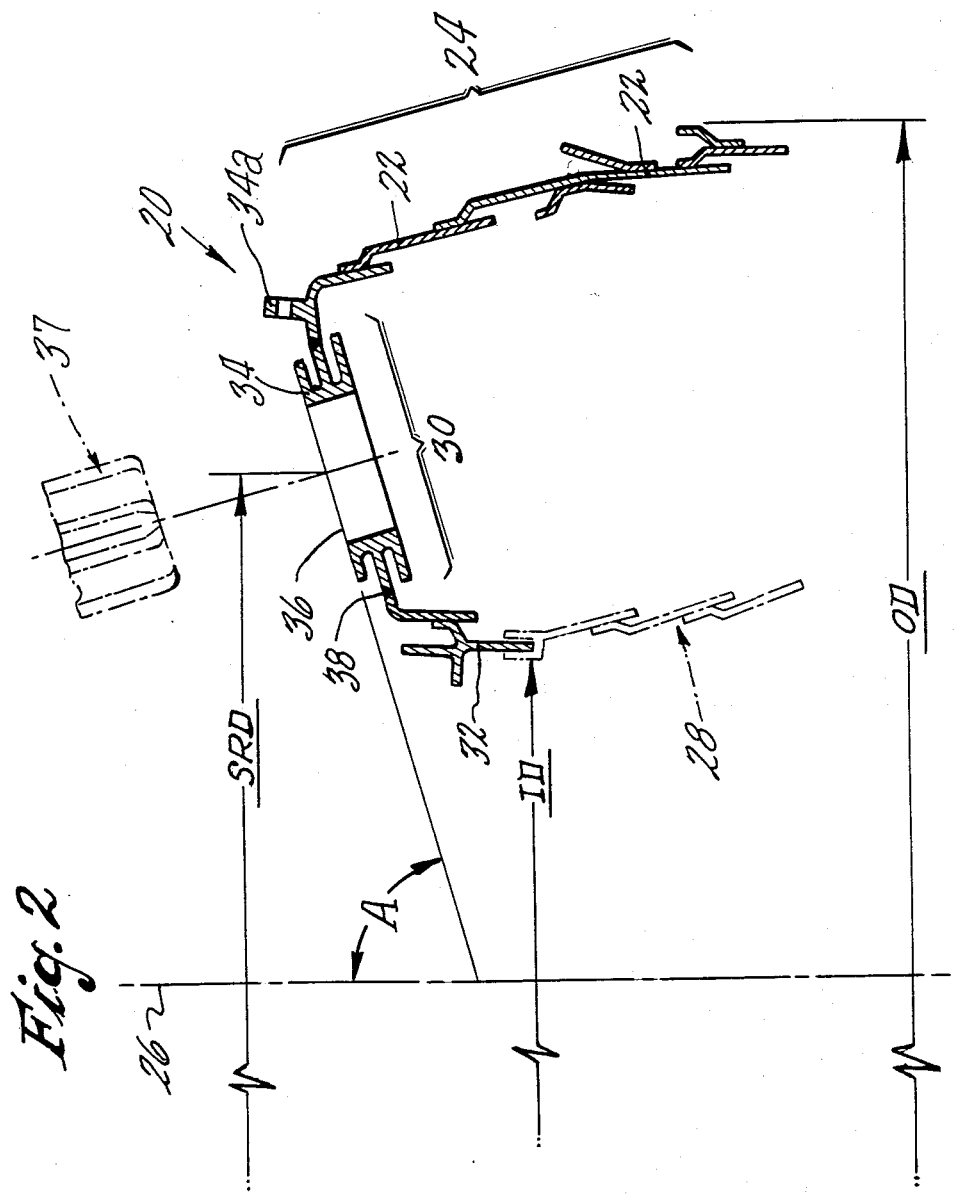
FIG. 2 shows a cross section through the combustor liner part shown in FIG. 1, together with other parts of a combustor assembly shown in phantom.

FIG. 1 shows the outer portion 20 (wall and attached bulkhead) of a combustor liner in association with certain parts of the apparatus used in the invention. FIG. 2 shows a section through the liner together with other parts of an entire combustor assembly, in phantom. For clarity, most of the small diameter holes which perforate the segments are not shown in this the cross section or in the other drawings of this application.

Referring to both FIGS. 1 and 2, the invention is described in terms of the reforming of the outer portion 20. This entire liner is comprised of a cylindrical outer wall 24 running around the central axis 26 and a cylindrical inner wall portion 28 shown in phantom. Both are made of welded together circular segments 22. There is a bulkhead or flangelike part 30 attached to the outer wall 24 and this part extends generally radially inwardly (at about a 73 degree angle A) toward the center line axis 26. The inner wall portion 28 mechanically mates with a tongue or boss 32 of the bulkhead 30. Circumferentially spaced apart around the bulkhead is a multiplicity of support rings 34, welded in place. When the combustor is used in the gas turbine engine each support ring receives a fuel nozzle 37, shown in phantom. Neither the fuel nozzle nor the inner liner are present during the processing which is described hereinafter. It will be apparent that the bulkhead could be fixed to the inner wall instead of the outer in another liner, for which the invention will be equally useful in repairing.

Referring again to FIG 2, the combustor liner has a number of dimensional check points. Included in these are the outside diameter OD, the inside diameter ID, the axial relationship between the boss 32 and the mounting lug 34a, and so forth. Most particularly, the present invention is concerned with the proper locating of the diameter SRD of the support rings 34. The invention is also concerned with obtaining the desired angular alignment A of the surface 36 of each support ring 34 with respect to the axis 26. Typically, the support ring location diameter SRD in a used combustor liner is less than both that which it had when it was new and that which is required in a remanufactured product. Also, usually the old support rings are cut away at their periphery joint 38 where they are welded and new support rings are inserted. In this replacement procedure, the support rings are fixtured with respect to the parts 30, 24 of the liner. After GTAW welding, the weldment is removed from the fixture. We have discovered that despite the accuracy of the fixture, the diameter SRD will be typically found to be less than that which is sought. This has necessitated reforming.

But the contours of the entire combustor liner assembly are carefully calculated for aerodynamic and combustion reasons, they are not simple, and therefore the structural dynamics which caused the unwanted deformations are not readily understood. The practical problem is to replace the support rings and to undo the distortion that has occurred in service or repair. Not unusually, the dimension of the diameter SRD has to be increased by up to 0.3 inches. However, when various procedures were attempted to increase the diameter, such as by moving in synchronization all the support rings outwardly, the combustor liner became distorted or fractured to the point where weld repairing was not feasible from an engineering standpoint.

Figure 3:
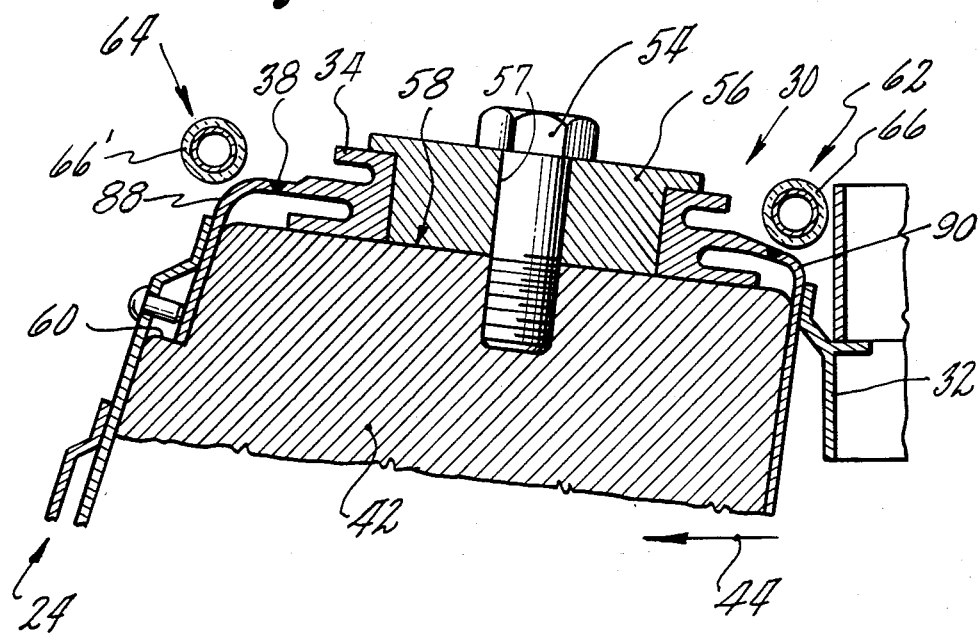
FIG. 3 is a cross section through a portion of the combustor liner and apparatus shown in FIG. 1 indicating how the liner is attached to the fixture.

The principles of the invention are illustrated by FIGS. 1, 3 and 4. In the invention the liner portion 20 is carefully heated in certain localized areas to about 1800° F., and while in that condition, the plurality of support rings are moved radially outward to a certain position. In doing this, the combustor liner section is mounted on a fixture (shown in fragment in FIG. 4) which is comprised of a multiplicity of segments 42 adapted to move radially outward in directions 44 when a central tapered cone 46 moves downward due to the action of a hydraulic cylinder 48. The outward travel of the segments is controlled by an adjustable stop nut 50 mounted on the cone 46. This hits the upper surface 52 of the segments. For a part which has 20 support rings spaced around a support ring diameter of about 34 inches, we use a fixture with 8 equal segments. It will be appreciated that when pairs or greater units of support rings are thus coupled, the travel path outwardly of any support is only approximately along a radius. Individual segments would work as well; our pairing is a simplificiation which lowers cost somewhat.

Referring to FIG. 3, each support ring is clamped to a segment 42 by means of a bolt 54 and a disk 56. The disk 56 is flanged to insure that the ring 34 is held firmly against the surface 58 of the fixture which has a slope which yields the desired orientation angle A of the supports. Preferably, each segment has a step 60 or other contour at its outer periphery to receive the steps in the segments of the outer wall 24 of the combustor liner part being repaired.

Induction heating coils 62, 64 are circularly mounted in close proximity to two portions of the combustor liner. This is shown in both FIGS. 1 and 3. It is seen that the inner coil 62 and outer coil 64 are connected in series and are part of the same continuous loop connected to a single induction heating machine. Of course, separate loops connected in parallel (with appropriate balancing) or loops connected to separate machines may be used as well. Each turn has fibrous insulation 66, 66', such as alumina silicate fiber wrapped around its circumference, to prevent electrical contact with the liner and at the same time to permit the closest possible spacing. When the combustor liner is securely bolted in the fixture segments, the induction heating coils 62, 64 are loosely taped to the liner in the positions shown.

To reform the liner, the band regions 88, 90 adjacent the coils are heated using an induction heating machine such as a TOCCO (Cleveland, Ohio) Model 2CS1-1 Induction Heating Machine with a frequency of 10,000 Hertz, running at about 200 volts, 120 amperes and 20 kilowatts. The liner is heated first to a temperature of 1600° F., where it is held for 2 minutes; it is then raised to 1700° F. and held for 30 seconds whereafter it is raised to 1800° F. and held for approximately 15-20 seconds. The temperatures are monitored by thermocouples attached at selected locations to the liner. The reason for preferring the stepping in the heating cycle is to insure that there is an evenness of heat. Other cycles may be used. It is desired to heat the liner very quickly since the tooling, because of its size and for economic reasons, is made of mild steel and is not adapted to withstand great heat. After the short holding period at 1800° F., the hydraulic cylinder 48 of the sizing fixture is activated and this causes the support rings to be forced radially outward in a matter of seconds, as indicated by the arrows 44. Then, power to the induction coil is terminated and air cooling, optionally forced air cooling, is used to cool the liner so that it may be removed from the fixture. When the heated liner reaches a temperature of between 100°-200° F., it is removed from the fixture and the resizing operation is complete.

It is found that it is necessary to heat bands both at the location 88 (by coil 64) and the location 90 (by coil 62).

These heated regions comprise a relatively narrow band 88 at the intersection of the outer cylindrical section 24 and the flange portion 30, and another relatively narrow circumferential band 90 on the opposite side of the support ring circle. The region 90 is on the portion of the bulkhead which extends transversely farthest from the circular portion 24. In FIG. 3 it is seen that there is another associated structure 32 typically associated with the inner portion of the bulkhead. This also is incidentally heated by the induction coil, but the principal focus is on the region 90.

Initially, we tried heating only one portion of the liner, namely the region 88. However, it was found that either the portions of the combustor liner in between the support rings buckled or ruptured, or in other respects the desired dimensioning was not obtained. In the present invention we must heat both the inner and outer portions. And as indicated, our inventive method is distinct from generally heating the entire bulkhead portion. Although difficult, this could of course be done. But it would require more time and high temperature fixturing inasmuch as considerable heat transfer to the tooling components would occur. Overheating of the rest of the liner and warping could occur. By selectively locating our heating in portions which are critical and not in intimate contact with the fixture, we are able to rapidly rework parts. The parts of the liner remote from the bands remain at about room temperatures. The support rings and parts of the flange 30 in between remain visibly nonradiant, below about 1200° F.

Each disk 58 has a hole 57 which is elongated in the direction transverse to the plane of the FIG. 3 cross section. Each disk is bolted to the surface 58 with sufficient force to keep it from lifting, but with insufficient force to keep it from sliding laterally, or circumferentially, as allowed by the slot orientation. This practice enables the support rings to maintain their even spacing during reshaping, when less fixture segments are used than there are support rings, as are preferred. Without the slotting of the disks, the part being reformed is prone to buckling.

When we perform the foregoing procedure it moves the support ring circle into conformance with that which is desired. The fixture prevents vertical motion of the rings. However, there can be insufficient correction of, or adverse effects on, other dimensions unrelated to the support ring circle. Therefore, we also undertake other mechanical reforming operations. These will have the effect at times of undoing the correct SRD dimension. When such occurs, we will use the procedure described herein a second time, or such additional times, as required.

Often times weld repair and other operations, unassociated with the support rings must be done. For instance, the segments 22 or the welds joining them must be repaired. Also, there are other straightening operations unassociated with the location of the support rings themselves. Previously, it was our practice to make all the repairs, including replacement of the support rings, and to then undertake the procedure described above. However, we have developed the following improved procedure for the specific instance where the support rings are replaced. Prior to removing the old rings, when the segments are moved radially outward to increase the diameter SRD, we move the support rings to a displaced position such that the dinmension SRD is greater than that desired in the final combustor liner. The degree greater has been determined by us by experience, and for the combustor liner described above typically is about 0.035 inches. After the liner has been straightened in the manner we describe and has been removed from the stretching fixture shown in FIG. 4, we cut the support rings away and replace them. This rewelding operation which is done in a fixture is similar to that described for the straightening operation (but without the movable segments). We find that the distortion that occurs during the welding operation is such that it will cause the dimension SRD to decrease, with the rings moving back approximately along their original path (about 0.030-0.040 inches diametrically), to a location which is desired in the final product. In our processing we are able to hold the dimension SRD to within ±0.005 inches when required.

Of course, other embodiments of the invention will be within the scope of the invention. Means for localized heating the areas we describe may be used beyond induction heating. For instance, laser or radiant heating may be used. Additionally, different temperatures may be used as experience dictates, according to the observed behavior and according to other metals which may be used in combustor liners.

Generally, we find that we heat Hastelloy X up to 1800° F., the lower end of the hot working range of 1800–2200° F., where the yield strength is decreased to about 15 ksi, which is about 25% of the yield strength typical of room temperature. Generally, for other high temperature alloys of which burners are made we would tend to heat for the same degree of weakening, generally so we are at the lower end of the hot working range. Higher temperatures in the hot working range may be used according to the characteristics of the material, the fixture force available, and the observed results, etc.

Although this invention has been shown and described with respect to a preferred embodiment, it will be understood by those skilled in the art that various changes in form and detail thereof may be made without departing from the spirit and scope of the claimed invention.

We claim:

1. The method of shaping an annular combustor liner made of a high temperature alloy and usable in a gas turbine engine, wherein the liner is comprised of a generally cylindrical wall section centered about an axis, a circular flange section attached to the cylindrical wall section and extending generally transverse to the axis, and a plurality of circumferentially spaced apart rings attached to the flange, each defining an opening through the flange which is suitable for receiving a fuel nozzle or the like; which method comprises simultaneously heating a first circumferential band of the liner where the wall section joins the flange section and a second circumferential band around the flange on the opposing side of the rings from the first band; and while the bands are heated, moving the rings generally radially with respect to the axis to a position displaced from their start position, and then cooling the heated band regions while holding the rings in their displaced position.

2. The method of claim 1 which comprises detaching the rings from the liner after they are moved to their displaced position; and fixturing and welding in their place new rings of approximately equal dimension, the welding inducing strains which cause the new rings to move to a new radial position which lies generally along the path traveled by the old rings during their movement to the displaced position.

3. The method of claim 1 characterized by heating the bands using two circumferential electrical conductors carrying high frequency current, where a circumferential conductor is placed in proximity to each of the inner and outer bands.

4. The method of claim 1 wherein the rings are restrained from any vertical motion.

5. The method of claim 1 wherein the liner is constructed of a wrought non-hardening high temperature nickel alloy and wherein the bands are heated to at least 1800° F.

6. The method of claim 5 characterized by heating the bands to 1800° F. in steps, first to 1600° F., then to 1700° F. and then to 1800° F.

* * * * *